US006690943B1

(12) United States Patent
Forde et al.

(10) Patent No.: US 6,690,943 B1
(45) Date of Patent: Feb. 10, 2004

(54) MULTIPLE BROADCAST FACILITY

(75) Inventors: Brian J. Forde, Dublin (IE); Paul C. Weinmann, Dublin (IE); Frank Dunne, Dublin (IE)

(73) Assignee: Koninklijke Philips Electronics N.V., Eindhoven (NL)

( * ) Notice: Subject to any disclaimer, the term of this patent is extended or adjusted under 35 U.S.C. 154(b) by 415 days.

(21) Appl. No.: 09/644,146

(22) Filed: Aug. 23, 2000

(30) Foreign Application Priority Data

Aug. 28, 1999 (GB) .............................. 9920324

(51) Int. Cl.$^7$ ................................ H04B 7/00

(52) U.S. Cl. .................. 455/518; 455/466; 455/465

(58) Field of Search ................ 455/462, 463, 455/465, 458, 518, 466

(56) References Cited

U.S. PATENT DOCUMENTS

| | | | | |
|---|---|---|---|---|
| 5,039,984 A | | 8/1991 | Andros et al. ......... | 340/825.44 |
| 5,255,308 A | * | 10/1993 | Hashimoto et al. ......... | 455/463 |
| 5,450,474 A | | 9/1995 | Hoflinger ..................... | 379/61 |
| 6,112,097 A | * | 8/2000 | Subhankar .................. | 455/462 |
| 6,201,974 B1 | * | 3/2001 | Lietsalmi et al. ........... | 455/466 |
| 6,253,089 B1 | * | 6/2001 | Schlosser et al. ........... | 455/465 |

FOREIGN PATENT DOCUMENTS

| | | | |
|---|---|---|---|
| WO | WO9810605 | 3/1998 | ............ H04Q/7/22 |

OTHER PUBLICATIONS

Patent Abstract of Japan: 548684(A). Date of Publication: Feb. 26, 1993; Int'l.
Patent Abstract of Japan: 08237193 A; Date of Publication: Sep. 13, 1996; Int'l.

* cited by examiner

*Primary Examiner*—William Trost
*Assistant Examiner*—Shared Rampuria
(74) *Attorney, Agent, or Firm*—Jack D. Slobod

(57) ABSTRACT

A broadcast system for communicating multiple simultaneous broadcast messages in a telecommunications system is provided, where the telecommunications system has at least one fixed terminal for communication with one or more portable terminals. The broadcast system includes means for transmitting first messages from the or each fixed terminal for reception by portable terminals in the reception area of that fixed terminal, each first message including information that specifies channels, selected for that fixed terminal, which will be used to convey an associated broadcast message. A control means is provided for causing the or each portable terminal to receive on the specified broadcast message channels. The transmitter means then transmits from the fixed terminal the broadcast messages on the said specified broadcast channels for substantially simultaneous reception and reproduction of a broadcast message, such as an audio broadcast message, by the or each portable terminal. Different portable terminals may receive different broadcast messages. The broadcast message channels are connectionless. The portable terminals may also roam into areas serviced by other fixed terminals and still be capable of receiving the broadcast messages. The system is particularly but not essentially based on a modified form of the Digital Enhanced Telecommunications (DECT) Standard.

22 Claims, 1 Drawing Sheet

MULTIPLE BROADCAST FACILITY

Figure 1:
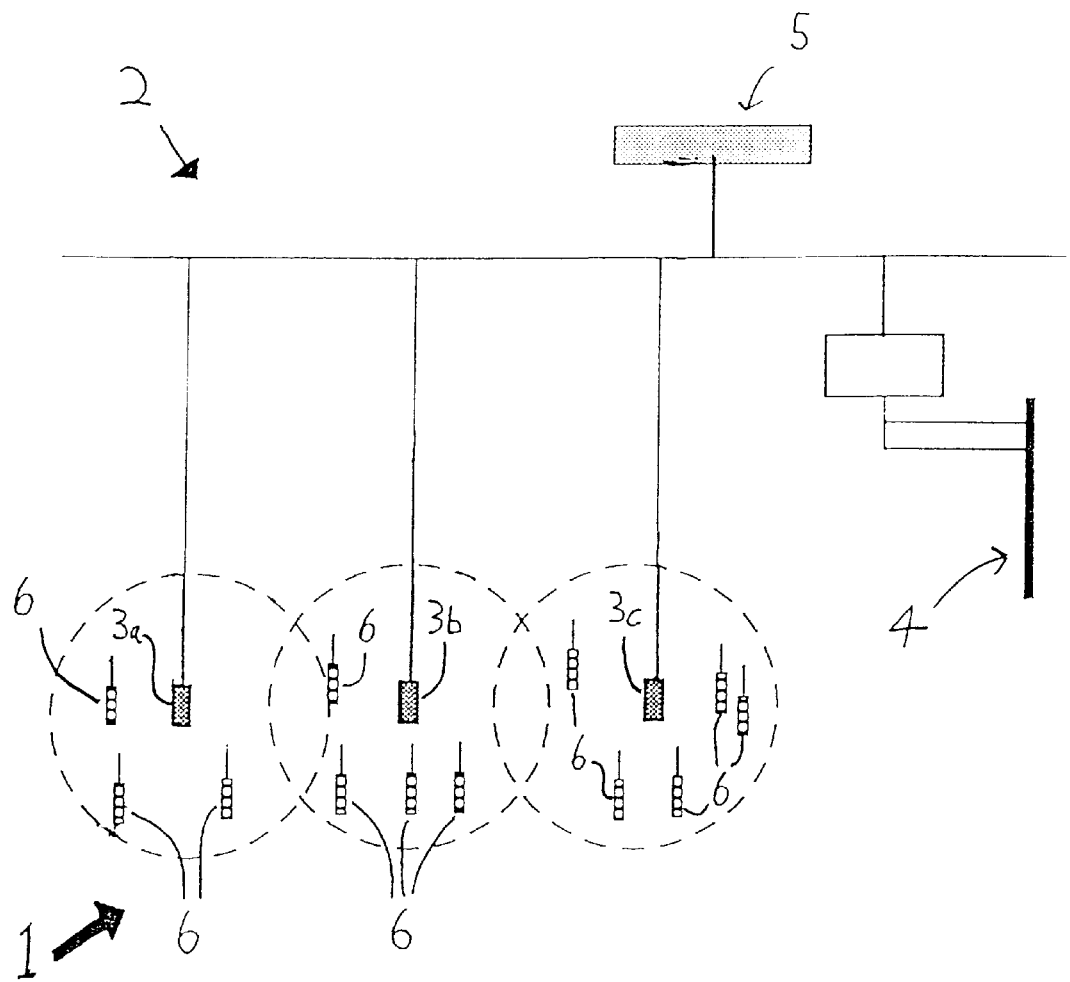

The present invention relates to a system and method for communicating multiple broadcast messages over a telecommunications system to a plurality of subscriber terminals and in particular to a system and method that allows the broadcasting of multiple streams of information to a plurality of wireless portable terminals. The system is particularly but not essentially based on the Digital Enhanced Telecommunications (DECT) standard.

It is known to provide telecommunications systems with an audio broadcast facility of some type, depending on the requirements and the capability of the particular system. The message that is broadcast may then be received by a plurality of the system users. One basic system is noted in the English language abstract of Japanese patent application number JP-A-5-48684. The abstract relates to a cordless telephone set having a telephone master set provided with a voice recording part, a radio (transmitting) part and antenna. A plurality of slave sets are provided with an antenna, radio part, an amplifier and a speaker. A recorded voice message may then be transmitted from the master set to the slave sets.

With such an arrangement, if each slave set is provided with only a simple receiver section (radio part), the receiver section may then be required to support not only reception of the broadcast but also support the exchange of normal telephone traffic with the master set. Problems can arise if a slave set is already being used for conducting a telephone conversation. Further problems may be experienced when attempting to transmit a broadcast to particular slave sets. No mention is made of any facility for broadcasting multiple messages.

Another approach to providing an audio broadcast facility to a plurality of terminals in a telecommunications system is for a base station or some other type of control unit to set up a telecommunications link with each terminal of the plurality in a manner that is conventional for the system, that is, the type of link that is used to carry voice or data file traffic. The audio message is then broadcast by sending it over each of the links simultaneously in the same manner that the voice signal of a normal telephone conversation would be carried. Since an individual point-to-point link needs to be established with each terminal simultaneously, this can place a heavy, if not impossible demand on the system which may only be provided with resources sufficient to establish calls to a limited number of terminals at a given time. The problem may be alleviated to some extent by setting up calls to individual terminals of the plurality one by one, or to fractions of the total number of the terminals sequentially, although this will lead to a delay while a broadcast is made to each of the terminals (or fractions of the total number of terminals) for which the broadcast is intended. This may be unacceptable in certain situations and applications, especially if the welfare of personnel using the terminals is somewhat dependant on timely reception of the broadcasts.

In telecommunications systems employing wireless links to portable terminals, attempting to provide a broadcast (such as an audio broadcast) by establishing such traffic calls to a large number of portable terminals simultaneously is even more difficult. This is partly due to the limited number of channels that may be handled by a single base station and the amount of radio spectrum that has been allocated for use by such telecommunication systems. An example of one such system is a DECT compliant telecommunications system (DECT is an abbreviation for Digital Enhanced Cordless Telecommunications). DECT systems are described in the standard ETS 300 175 of which there are several parts. The standard is published by the European Telecommunication Standards Institute and is incorporated herein by reference.

In a DECT compliant telecommunications system the portable terminal is called the portable part (PP) and the fixed terminal is called the fixed part (FP). The fixed part includes at least one radio fixed part (RFP) which is a radio termination (or radio end point) for communication with the portable part. In this case performing a broadcast call to a number of portable parts by setting up an ordinary voice or data carrying channel (known in DECT as a traffic bearer) to each portable part (PP) would quickly exhaust system capacity and overload system resources. This would result in the inability to broadcast to more than just a few PP's and even the failure to maintain or establish normal voice or data communications to PP's while the broadcast occurs. If such a system is required to convey multiple broadcast messages then system capacity may be exhausted in the same way.

It is an object of the present invention to provide a system for the broadcasting of multiple, simultaneous messages such as audio messages or data files over a telecommunications system that allows a plurality of portable terminals to receive at least one of the messages that are broadcast.

It is another object of the present invention to provide a system for the broadcasting of multiple, simultaneous messages such as audio messages or data files over a telecommunications system and which allows a plurality of portable terminals to receive at least one of the messages that are broadcast, while at the same time making efficient use of system resources.

In accordance with a first aspect of the present invention there is provided a broadcast system for communicating multiple at least partially overlapping broadcast messages in a telecommunications system having at least one fixed terminal for communication with one or more portable terminals, said broadcast system including:

first transmitter means for transmitting first messages from the or each fixed terminal, each message including information specifying a channel, selected for that fixed terminal, to convey one of the broadcast messages;

control means responsive to the first messages for individually causing the or each portable terminal to receive on at least one of the specified broadcast message channels; and second transmitter means for transmitting from the fixed terminal the broadcast messages on the said specified broadcast message channels for reproduction of at least one of the broadcast messages by the or each portable terminal.

The broadcast messages are typically audio or data file type messages.

The first and second transmitter means may be incorporated in the fixed terminal. Indeed the first and second transmitter means may be the same entity. The first and second transmitter means may be the same system component. The control means may be located in the portable terminal. Each of the first and second transmitter means and control means may be system applications or the like and the terms do not necessarily relate to hardware.

By broadcasting the messages as connectionless messages it is possible to transmit each message to a plurality of portable terminals without setting up an individual call to each portable terminal and therefore without exceeding the limitations of the system. Since each broadcast message may be transmitted independently of other broadcast messages the broadcasts can occur at the same time if so required.

Such a broadcast facility would be of particular use where portable terminals are being carried by security guards or medical workers, where quick substantially simultaneous broadcasting of messages or an alarm signal to personnel is important.

The broadcast system can be based on a modified form of the DECT standard. In this case the specified broadcast channels may be DECT physical channels, each of which may then be used to support a DECT simplex bearer. Each specified channel can be used to support a connectionless downlink bearer. By providing a broadcast system in the form of a modified DECT system, there are particular advantages to be gained, as the applicants have recognised, since the DECT standard allows for connectionless communications to be set up from the radio fixed parts of the fixed terminals to the portable parts although these connectionless communications are normally only used to carry system information and other control information. Although basic, known, unmodified DECT portable parts will not be able to receive the broadcast messages, their normal operation within the telecommunications system will be unaffected.

Furthermore, if the telecommunications system is based on a modified form of DECT compliant telecommunications system, the first messages may be transmitted as short page messages.

The broadcast system may further include:
means for assigning each portable terminal with a broadcast group identity; and
means for including broadcast group identity information in each first message,
wherein the control means causes the or each portable terminal to receive on one or more of the specified broadcast channels only if the said portable terminal has an assigned broadcast group identity that corresponds to the broadcast group identity transmitted in the first message for the one or more specified broadcast channel.

This allows only specific portable terminals to be selected for receiving particular broadcast messages. This may be advantageous for calling only certain groups of portable terminals, for example portable terminals carried by people who belong to a particular organisational department or who belong to a particular management level.

The broadcast system may also include means for periodic transmission of each first message for the duration of it's associated broadcast message to allow portable terminals to roam into geographical areas covered by a different fixed terminal and to receive broadcasts from the different fixed terminal even if this requires the roaming portable terminal to receive a broadcast message on a different specified channel and to change the specified channel that it receives on. This offers the obvious advantage of not restricting a user of a mobile terminal to be in the radio coverage area of a particular fixed terminal in order to continue to receive the broadcast message.

In accordance with a second aspect of the present invention there is provided a method for communicating multiple at least partially overlapping broadcast messages in a telecommunications system having at least one fixed terminal for communication with one or more portable terminals, said method comprising the steps of:
transmitting first messages from the or each fixed terminal, each message including information specifying a channel, selected for that fixed terminal, to convey one of the broadcast messages;
individually causing the or each portable terminal to receive on at least one of the specified broadcast message channels; and
transmitting from the fixed terminal the broadcast messages on the said specified broadcast message channels for reproduction of at least one of the broadcast messages by the or each portable terminal.

In accordance with a further aspect of the present invention there is provided a communications device apparatus having the technical features of the first transmitter means in the broadcast message system.

In accordance with a yet further aspect of the present invention there is provided a communications device apparatus having the technical features of the control means in the broadcast message system.

In accordance with a yet further aspect of the present invention there is provided a communications device apparatus having the technical features of the second transmitter means in the broadcast message system.

Other aspects and optional features of the present invention appear in the appended claims, to which reference should now be made and the disclosure of which is incorporated herein by reference.

The present invention will now be described by way of example only with reference to the accompanying drawing, FIG. 1, which shows a schematic representation of a telecommunications system incorporating the present invention.

The particular communications system shown in the Figure is based on a DECT compliant cellular communications system 1 in which the fixed terminal takes the form of a DECT fixed part (FP) 2 which includes a plurality of radio end points in the form of DECT radio fixed parts (RFP's) 3. Three such RFP's 3a, 3b, 3c are shown.

Although the present system is based on a DECT compliant system, the present system is provided with various features which fall outside the scope of the current DECT base standards. Such features will be highlighted where appropriate, but for the purpose of understanding the present invention, references to 'DECT compliant' or 'DECT' when discussing particular features should be taken to indicate normal DECT functionality unless otherwise stated.

The RFP's 3 are networked together and FP 2 is connectable via an interface to external telecommunication networks such as the public switched telephone network 4 although this is optional. The FP also includes a control unit 5 which serves to control the general operation of the whole system including the interoperability of the RFP's 3 with each other. The control unit 5 may also be provided with private automatic branch exchange (PABX) functionality. Although a number of RFP's 3 are used to form a multi cell system, it is possible to provide a single cell system which uses only one RFP 3. In a DECT compliant system a portable terminal takes the form of a portable part (PP) 6 which is capable of establishing communication with the fixed part by establishing a wireless link with a RFP 3a, 3b, 3c. This allows the exchange of traffic such as voice or data, as is well known to the person skilled in the art. Although twelve PP's are shown other numbers may be used. The wireless link communication between an RFP and a PP is provided by so-called bearers which are established on one or more DECT physical channels (channel). Each channel is created by transmitting on one particular slot on one particular radio frequency (RF) in successive time division multiple access (TDMA) frames.

As stated above, a DECT communications system may be provided with one RFP 3 or a number of RFP's 3. Obviously, if the system has only one RFP 3 then this RFP must cater for all connections that are established with the PP's 6. However, in the case of a system having a plurality of RFP's 3, (as is the case for the system illustrated in FIG. 1), provided for the purpose of increasing system capacity and/or coverage area, connections are established between RFP's 3 and PP's 6 depending on the available link quality, which usually though not always results in a link being established between the PP 6 and the nearest RFP 3.

Before the PP6 can participate in traffic communication with the fixed system it needs to attain a condition where it is synchronised with a RFP 3 of the FP 2. This is made possible in a DECT system because each RFP 3 maintains transmissions that carry information relating to the identity of the particular RFP 3 and the FP 2 it is connected with together with other system information. Because each RFP 3 is always transmitting such information a PP 6 is able to receive on each DECT system channel in turn and to monitor for activity on those channels.

This transmitted information is called N-channel and Q-channel information as will be understood by the person skilled in the art. For the purpose of clarity it should be mentioned that the DECT N-channel and DECT Q-channel are logical channels and not DECT physical channels.

Because it is the responsibility of the PP 6 to detect the presence of any nearby RFP's 3, when a PP 6 is activated it begins to listen on each DECT channel for N-channel and Q-channel information broadcast by the RFP's 3. If a given RFP 3 is not involved in supporting a traffic connection with a PP then this information is broadcast by itself on a so-called dummy bearer. If a given RFP 3 is involved in supporting one or more traffic connection with one or more PP's 6, the RFP 3 broadcasts this information on each traffic bearer. A RFP 3 supporting at least one traffic connection may drop the dummy bearer although the broadcast of the N-channel and Q-channel information on the dummy must be restored if all traffic connections with that RFP 3 cease. In any case a RFP 3 will always be transmitting N and Q-channel information on at least one DECT channel. The dummy bearer is not intended for reception by a particular PP 6 but is merely for making RFP 3 identity and system information available all of the time to any in-range PP's 6 that happen to be in the vicinity.

When a PP 6 is initially switched on, it listens out for the presence of an in-range RFP 3 by scanning through all the valid DECT channels until if finds one with some activity. If the RFP 3 is indeed already supporting a voice or data call to one or more other PP then so-called traffic bearers are already established between the RFP 3 and those PP's and the system information will be found in these. This is sufficient to service the PP 6 with the system information that it needs to synchronise with the RFP 3 and be in a condition ready to make or receive calls to it. If however the RFP 3 is not supporting any voice or data calls there will be no traffic bearers and hence PP's 6 in the vicinity of the RFP 3 rely on the so-called dummy bearer transmitted by the RFP 3 at regular intervals on one of the valid DECT channels so that the PP's may synchronise with this.

The PP 6 sets up a so-called synchronisation bearer on the various DECT channels to determine if a nearby RFP is indeed transmitting on that channel. If it is established that this is not the case, a synchronisation bearer is set up on a different DECT channel until a channel is found that is carrying N-channel and Q-channel information. Setting up a synchronisation bearer allows any N-channel and Q-channel information on a DECT channel to be read. This information is used by the PP 6 to determine if it has access rights to the fixed part, and if it does, the PP 6 enters a state in which it is ready to make and receive calls.

A traffic bearer, as is normally used for voice or data communication, operates in a connection oriented mode since it involves the three stages of setting up a connection from one source to one or more destination, transferring data, and finally releasing the connections. In contrast, a dummy bearer operates in a connectionless mode, since it involves the transmission of self contained units of data from one source to one or more destination. A further type of bearer exists and is called a connectionless bearer. It is similar to a dummy bearer, except that while a dummy bearer can only carry system information, the connectionless bearer can carry other types of information. Further information on the nature of these different bearers is given in the above mentioned DECT standard and will not be reproduced herein unless relevant to understanding of the present invention.

Since all types of bearer contain RFP and system information in the form of N-channel and Q-channel information, all PP's in range of and synchronised with a RFP, whatever their present state (for example, engaged with a voice call or in an idle condition), receive and have access to this information. Another type of DECT logical channel is called the P-channel which contains paging information from the RFP to the PP. When paging information is transmitted, it also appears on all bearers. Therefore any PP which is able to receive N-channel and Q-channel information will also be able to receive any transmitted P-channel information. Because all synchronised PP's always hear any P-channel information that is transmitted, information is carried on this channel to instruct a particular PP which channel to receive on.

In order to broadcast a message such as an audio message or data file to a particular PP, that PP is first invited to receive on a particular DECT channel that will be used as the broadcast channel for carrying the broadcast information. Once the PP is receiving on that channel the message is transmitted on that channel for reception by the PP. By inviting a plurality of DECT PP's to receive on that channel, all of those PP's will then be able to receive the broadcast message.

A connectionless downlink bearer is set up by each RFP on the broadcast channel, which may be different for each RFP. All PP's in range of a RFP are now capable of receiving the broadcast message simultaneously if they listen to the channel selected on that RFP for carrying the connectionless downlink bearer. As stated above, a connectionless bearer is similar to a dummy bearer, but in this case the connectionless bearer has it's B-field filled with information relating to the broadcast message itself, as will be understood by the person skilled in the art. Although the message may contain voice or data file information, other types of information could be broadcast such as information representing an alarm signal. It is noted that this is in contrast to the concept of establishing a traffic bearer to each in-range PP for which the broadcast message is intended and relaying the message over these traffic bearers. A DECT RFP cluster is only capable of supporting a limited number of traffic bearers and there is an absolute number of traffic bearers that, may be established in a DECT system anyway before frequency reuse becomes necessary. Therefore, by employing a connectionless bearer for carrying the broadcast message, a plurality of PP's may receive the message without unduly loading the telecommunications system.

In order for a given PP to actually receive and reproduce the broadcast message, a first message containing information telling the PP's which DECT channel is being used for the broadcast message is transmitted by each RFP on all bearers as a short page message. The short page message which is transmitted on the P-channel, is used to identify the DECT channel that will carry the broadcast message. Short page messages are normally carried in the A-field, as will be known to the person skilled in the art.

In practice, if a dummy bearer is in use by a particular RFP, it is preferable to convert the dummy bearer into a connectionless downlink bearer for carrying the broadcast message thus claiming the DECT channel previously used for carrying the dummy bearer, rather than to set up a connectionless downlink bearer on a different DECT channel. One reason for this preference arises because if a given RFP is transmitting only a dummy bearer, any PP's synchronised with that RFP will be receiving on the DECT channel carrying the dummy bearer. This will generally avoid the need to instruct a PP to receive on a different DECT channel.

Now taking the example of providing a second broadcast message while the first broadcast message is being transmitted, the second broadcast message is provided by setting up a second connectionless downlink bearer from each RFP. For a given RFP, the second connectionless downlink bearer will be on a DECT channel different to the first connectionless downlink bearer. The B-field of the second connectionless downlink bearer is filled with information relating to the second broadcast message itself, as will be understood by the person skilled in the art.

In order for a given PP to actually receive and reproduce the second broadcast message, a further instance of first message is generated which contains information telling the PP's which DECT channel is being used for the second broadcast message. This further instance of first message is transmitted by each RFP as a short page message on all existing bearers. As stated above, because the short page messages are carried on the P-channel they can be present and are normally contained in all bearers and are normally carried in the A-field. This results in all PP's hearing the short page messages which notifies them of the existence of a broadcast. A PP can then receive on the DECT channel carrying the second connectionless bearer, and therefore the second broadcast message, to reproduce the second broadcast message. It is possible to provide further instances of broadcast messages in the same way that the second broadcast message is provided, each broadcast message having an associated first message. Because each broadcast message may be performed independently of the others, it is possible to provide multiple overlapping simultaneous broadcast messages in the system. It is noted that the second and further connectionless downlink bearers are unlikely to be set up by converting the dummy bearer into one of these connectionless downlinks, since the dummy will have normally been converted into the first connectionless downlink bearer.

By 'simultaneous' it is meant that more than one broadcast message may be provided at the same time. Since each broadcast message is unrelated and independent of any other broadcast message there is no such requirement that the broadcast messages are to be synchronised with each other or necessarily performed at the same time.

The above described mechanism of providing a single broadcast message in a DECT telecommunications system would appear to comply with the current DECT standards. However, the presently described mechanism of providing second and further instances of simultaneous broadcast messages by adding second and further connectionless downlink bearers, respectively, requires a departure from the current version of the DECT base standards. According to the standards, for each cluster of cells only one instance of connectionless message control downlink service may exist.

(Connectionless message control (CMC) relates to the functions that control and distribute the information of all connectionless services to one or more connectionless bearer control, as will be understood by the person skilled in the art). Although each CMC allows a maximum of two connectionless bearers, the second is only intended for channel hopping purposes and the data on each bearer is exactly the same. Therefore, second and further broadcast calls carried on second and further connectionless downlink bearers require second and further instances of CMC respectively.

The presence of second and further instances of CMC does not affect the normal operation of a DECT based system. This means that it is possible to use an unmodified PP with the telecommunications system, although such a PP would not be able to receive broadcast calls.

It is not always a requirement for all PP's to receive a broadcast message and it is possible to cause a given broadcast message to be received by only one of the PP's or a selection of the PP's. PP's may be assigned an identity or group identity, and only those PP's carrying that particular identity may elect to receive a given broadcast. This may be achieved in a DECT system by assigning a Group Temporary Portable User Identity (TPUI) to a portable part, or a group of portable parts so that only those PP's having a particular TPUI are invited to receive the broadcast message. More than one TPUI may be employed in the system thus allowing different groups of PP's to be created and independently selected for receiving a broadcast. The TPUI related information is also present in the P-channel and is carried in the short page message, so again, all PP's are capable of receiving this information. The use of identities and addressing will be known to the person skilled in the art and further information is contained in the DECT standards. Throughout the description, a reference to a TPUI should be read as a reference to a connectionless group TPUI unless the context suggests otherwise. An example of where this is not the case would be a reference to an individual TPUI, as will also be understood by the person skilled in the art.

The MAC layer information in the short page message contains the location of the connectionless bearer, i.e. in terms of time slot and frequency. This may be different for each RFP. The short page message may originate from an application in the RFP. In particular the short page message contains information present in the P-channel; that is the identity of the PP's which should receive the broadcast message, and the DECT channel the broadcast is transmitted on.

The broadcast message may originate from anywhere in the system and for example may originate from the PSTN or from another PP. In the latter case the message is transmitted from the PP to an in-range RFP over a normal traffic bearer, after which the message is broadcast to the other PP's by the mechanism described above. The originator of the broadcast message may specify the group for which the broadcast is intended by forwarding the appropriate TPUI information. In one example this may be generated by the user indicating the intended recipients by entering information via the keypad of the PP.

Each RFP ensures the quality is maintained of each connectionless downlink bearer currently in use. Connectionless bearer hopping may be employed to change to another DECT channel if channel quality is poor. A short page message can be used to inform PP's synchronised with the RFP of the new channel carrying the connectionless bearer. When the connectionless bearer is moved to a different channel, a new page is sent out regularly to inform all of the in range PP's of this. Furthermore, for a given broadcast message, it's associated connectionless downlink bearer will not necessarily be on the same DECT channel for each RFP, so short page messages specifying the location of the connectionless downlink bearer and the broadcast call TPUI information will be sent out regularly by each RFP for the entire duration of the broadcast message. This will allow PP's to roam into a cell served by a different RFP which may well be transmitting the connectionless downlink for a given broadcast message on another DECT channel, and still receive the broadcast message if necessary by receiving on that channel. It also allows a PP which is activated only during a broadcast to begin receiving the broadcast. Connectionless bearer handover could also be implemented in other ways although this may violate the DECT standard.

Optionally a number of TPUI's may be used, each having a priority value assigned. Where priority values are employed, a PP can be set to receive or reject a broadcast call depending on the priority value associated with the broadcast.

A given PP may have a number of identities assigned to it. Furthermore, if a given PP is instructed to receive more than one broadcast message simultaneously a signal could be generated by the portable part alerting the user to switch to a different broadcast. The user could be alerted, for example by an audio tone or a display message. Alternatively, if the broadcast message is of data, an application on the portable part could automatically switch to a different one of the broadcast calls. Each broadcast message may be assigned a priority value allowing the PP to alert the user of the PP depending on the priority value of the message. Furthermore, the PP may automatically switch to receive the broadcast message having the highest priority value. A priority value could be reserved for indicating an emergency status in which case any broadcast having such an assigned priority value will be received and reproduced by portable parts irrespective of whether they are already supporting a broadcast or normal connection based call.

A given PP could receive more than one broadcast message simultaneously. This would allow an audio broadcast, for example, to be reproduced, while a further audio broadcast could be stored. Other combinations of received broadcasts include audio and data and audio and video broadcasts.

If a PP is already being used for a normal connection based call, the occurrence of a broadcast to that terminal can have a number of effects. For example, a signal could be generated by the portable part alerting the user of the broadcast allowing the user to switch to the broadcast or ignore it. The user could be alerted, for example, by an audio tone or a displayed message. If the user chooses to accept the broadcast, the normal connection based call may be put on hold. Alternatively, the portable part could automatically switch to reproduce the broadcast, perhaps also putting the normal call on hold. The automatic switch could be implemented so that it only occurs if broadcasts have specified associated priority values. A PP may be provided with means for reproducing a audio broadcast call at a volume which is greater than that employed during a normal connection based call. For this purpose a loudspeaker may be provided in the portable part which may be activated automatically. As stated above, the broadcast could be representative of an alarm signal. Such a broadcast could be initiated by a user of a PP activating an alarm function provided on the PP.

The control unit sends a broadcast message to all RFP's containing the group TPUI and which broadcast messages are to be transmitted by the RFP's.

The broadcast group identities (which are group TPUI's in the specific example) can be assigned to a PP just after the PP has subscribed, or at location registration when the individual TPUI is assigned. Alternatively, the identity could be assigned at any time since it is permitted to re-arrange a PP into different groups at any time. A PP can be a member of multiple groups.

This application is related to our co-pending UK patent application number GB9920325.9 entitled 'Broadcast Facility'.

While the present invention is described in some detail with reference to a DECT compliant telecommunications system carrying modifications, it is noted that the invention could be implemented in other telecommunication systems capable of establishing multiple instances of connectionless messaging. In this case portable terminals are instructed to receive the messages using a form of addressing different to DECT TPUI addressing. That is, the target audience of the call is defined by a group identity, which may be programmable for each portable terminal.

From reading the present disclosure, other modifications will be apparent to persons skilled in the art. Such modifications may involve other features which are already known in the design, manufacture and use of systems and devices and component parts thereof and which may be used instead of or in addition to features already described herein.

What is claimed is:

1. A broadcast system for communicating multiple at least partially overlapping broadcast messages in a telecommunications system including a first fixed terminal for communication with a plurality of portable terminals, said broadcast system comprising:

first transmitter means for transmitting a first message from the first fixed terminal, the first message including information specifying a first channel, selected for said first fixed terminal, to convey a first broadcast message;

control means responsive to the first message for individually causing each portable terminal to receive on the first specified broadcast message channel; and second transmitter means for transmitting from the first fixed terminal the first broadcast message on the specified broadcast message channel for reproduction of the first broadcast message by each portable terminal.

2. The broadcast system in accordance with claim 1, wherein the first specified broadcast message channel is established on a DECT physical channel.

3. The broadcast system in accordance with claim 1, wherein the first specified broadcast message channel supports a DECT simplex bearer.

4. The broadcast system in accordance with claim 1, wherein the first specified broadcast message channel supports a connectionless downlink bearer.

5. The broadcast system in accordance with claim 2, wherein the first message is transmitted as a short page message.

6. The broadcast system in accordance with claim 1, further comprising:

means for assigning each portable terminal with a broadcast group identity; and means for including broadcast group identity information in the first message, wherein said control means causes a first portable terminal to receive on the specified broadcast message channel only if said first portable terminal has an assigned broadcast group identity that corresponds to the broadcast group identity transmitted in the first message for the first specified broadcast message channel.

7. The broadcast system in accordance with claim 6, wherein the broadcast group identity information is expressed as a DECT group temporary portable user identity (TPUI).

8. The broadcast system in accordance with claim 1, wherein at least one broadcast message of the multiplicity is initiated at and originates at a first portable terminal in communication with one of said first fixed terminal and a second fixed terminal of the system.

9. The broadcast system in accordance with claim 1, further comprising:
   means for assigning each portable terminal with a broadcast group identity; and
   means for including broadcast group identity information in each first message,
   wherein said control means causes a first portable terminal to receive on the specified broadcast message channel only if said first portable terminal has an assigned broadcast group identity that corresponds to the broadcast group identity transmitted in the first message for the first specified broadcast message channel wherein at least one broadcast message of the multiplicity is initiated at and originates at a second portable terminal in communication with one of said first fixed terminal and a second fixed terminal of the system, and the broadcast group identity information in the first message associated with the at least one broadcast message is selected and originates at said second portable terminal.

10. The broadcast system in accordance with claim 1, further comprising:
    means for a transmission of the first message for the duration of the first broadcast message to allow one or more portable terminals to roam into a geographical area covered by a second fixed terminal of the system and to receive broadcasts from said second fixed terminal even if this requires a roaming portable terminal to receive the first broadcast message on a second specified broadcast message channel.

11. The broadcast system in accordance with claim 1, wherein the first specified broadcast message channel is connectionless.

12. A method for communicating multiple at least partially overlapping broadcast messages in a telecommunications including a first fixed terminal for communication with a plurality of portable terminals, said method comprising the steps of:
    transmitting a first message from the first fixed terminal, the first message including information specifying a first channel, selected for the first fixed terminal, to convey a first broadcast message;
    individually causing each portable terminal to receive on the first specified broadcast message channel; and
    transmitting from the first fixed terminal the first broadcast message on the first specified broadcast message channel for reproduction of the first broadcast message by each portable terminal.

13. The method in accordance with claim 12, wherein the first specified broadcast message channel is established on a DECT physical channel.

14. The method in accordance with claim 12, wherein the first specified broadcast message supports a DECT simplex bearer.

15. The method in accordance with claim 12, wherein the first specified broadcast message channel supports a connectionless downlink bearer.

16. The method in accordance with claim 13, wherein of the first message is transmitted as a short page message.

17. The method in accordance with claim 12, further comprising the steps of:
    assigning each portable terminal with a broadcast group identity;
    including broadcast group identity information in the first message; and
    causing a first portable terminal to receive on the first specified broadcast channel only if said first portable terminal has an assigned broadcast group identity that corresponds to the broadcast group identity transmitted in the first message for the first specified broadcast message channel.

18. The method in accordance with claim 17, wherein the broadcast group identity information is expressed as a DECT group temporary portable user identity (TPUI).

19. The method in accordance with claim 12, wherein at least one broadcast message of the multiplicity is initiated at and originates at a first portable terminal in communication with said first fixed terminal.

20. The method in accordance with claim 12, further comprising the steps of:
    assigning each portable terminal with a broadcast group identity;
    including broadcast group identity information in the first message; and
    causing a first portable terminal to receive on first specified broadcast message channel only if said first portable terminal has an assigned broadcast group identity that corresponds to the broadcast group identity transmitted in the first message for the first specified broadcast message channel, wherein at least one broadcast message of the multiplicity is initiated at and originates at a second portable terminal in communication with one of said first fixed terminal and a second fixed terminal of said system, and the broadcast group identity information in the first message associated with the broadcast message is selected and originates at the said second portable terminal.

21. The method in accordance with claim 12, further comprising the step of:
    transmitting the first message for the duration of the first broadcast message to allow one or more portable terminals to roam into a geographical area covered by a second fixed terminal of the system and to receive broadcasts from said second fixed terminal even if this requires a roaming portable terminal to receive the first broadcast message on a second specified broadcast message channel.

22. The method in accordance with claim 12, wherein the first specified broadcast message channel is connectionless.

* * * * *